Figure 1:
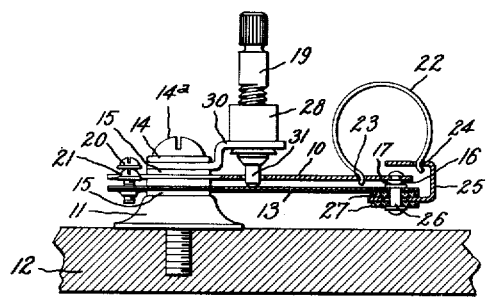

June 29, 1937.  R. L. UHL  2,085,557

CONTROL DEVICE

Filed Dec. 2, 1933

Inventor:
Robert L. Uhl,
by Harry E. Dunham
His Attorney.

Patented June 29, 1937

2,085,557

UNITED STATES PATENT OFFICE 2,085,557

CONTROL DEVICE

Robert L. Uhl, Ontario, Calif., assignor to Edison General Electric Appliance Company, Inc., Chicago, Ill., a corporation of New York Application December 2, 1933, Serial No. 700,685

9 Claims. (Cl. 200—139)

My invention relates to control devices, more particularly to control devices for controlling an electric circuit in accordance with temperature changes, and it has for its object the provision of an improved device of this character.

Although it is not limited thereto, my invention is especially applicable to electric switches intended to be used in connection with temperature control devices in which a temperature responsive member, such as a bimetallic strip is provided to actuate the switch, and in which a suitable spring member is provided to give the switch a snap action so as to move the switch quickly between its controlling positions.

My invention contemplates a new organization in a control device of this type whereby a small, compact and yet efficient thermostat is provided, and one which can be manufactured at a very low cost.

In accordance with my invention, I provide a flexible switch actuating arm which has one end fixed and its other end free to move. Mounted on the free end of the switch arm is a contact which is arranged to cooperate with a contact carried by a suitable temperature responsive device, such as a bimetallic bar. This bar preferably will be arranged in substantially parallel relation with the switch arm and will have one end fixed and its other end free to move in response to changes in temperature. This latter end carries the contact which cooperates with the contact carried by the free end of the resilient switch arm.

A suitable spring member bears on the switch arm and functions to move the switch arm quickly between its controlling positions. In one form of my invention, this resilient member has a substantially U-shape, one arm of the U bearing on the switch arm at a point between its fixed end and the contact carried on its free end. The other arm of the U rests on a bearing carried by the bimetallic thermostat bar. The parts are so arranged that when the bimetallic thermostat bar moves in response to changes in temperature it shifts the position of the U-shaped spring so as to operate the switch arm from one controlling position to another. In this form of the invention, suitable means are provided for changing the position of the thermostat bar so as to change the temperature setting of the device.

In another form of my invention, the U-shaped spring member has one arm bearing on the free end of the bimetallic thermostat bar and its other arm resting on a bearing carried by the resilient switch member. In this form of my invention, suitable means are provided for changing the position of the resilient switch arm and hence, the position of the spring bearing carried by it, so as to change the temperature setting of the control device.

Figure 2:
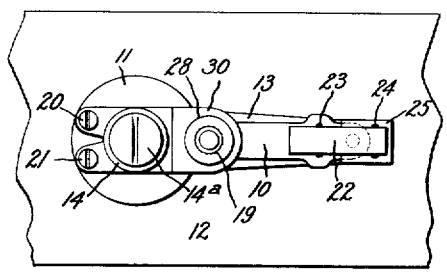
Figure 3:
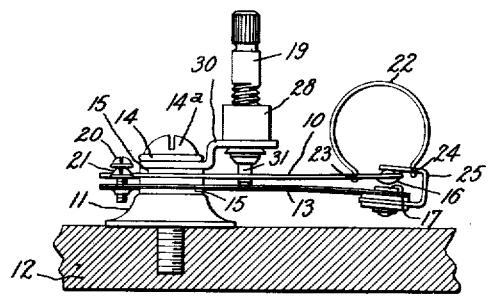
Figures 4, 5:
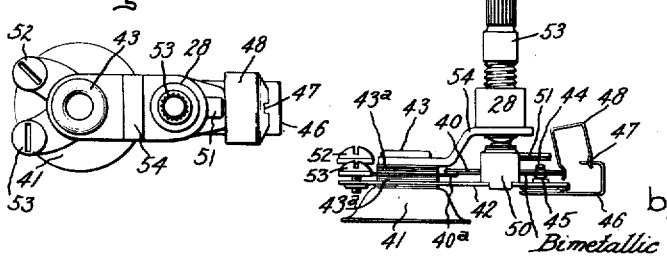

For a more complete understanding of my invention, reference should be had to the accompanying drawing in which Fig. 1 is an elevation, partly in section, illustrating a temperature control device arranged in accordance with my invention; Fig. 2 is a plan view of the temperature control device of Fig. 1; Fig. 3 is a view similar to Fig. 1, but illustrating the temperature control device in a different operative condition; Fig. 4 is a plan view illustrating a temperature control device of modified form arranged in accordance with my invention; and Fig. 5 is an elevation of the temperature control device shown in Fig. 4.

Referring more specifically to Figs. 1–3 inclusive, I have shown my invention in one form as applied to a control device comprising a flexible switch arm 10 which has one end rigidly secured to a supporting member 11 which in turn is mounted upon a support 12. The support 12 may be the device that is heated and whose heating circuit is to be controlled by the control device in accordance with the temperature of the plate 12 so as to hold a constant temperature in the plate. For example, the member 12 may be the sole plate of an electric flatiron.

Mounted in substantially parallel relation with the switch arm is a suitable bimetallic thermostat bar 13 which also has one end rigidly secured to the base or support 11. The other ends of both the switch arm 10 and the bimetallic bar 13 are free to move. It will be understood that the free end of the bimetallic bar 13 will move laterally in response to changes in temperature in the bar. Preferably, the bar 13 will be mounted below the switch arm and relatively close to the body 12 whose temperature is to be controlled. The bimetallic bar is made of two strips of metal having dissimilar temperature coefficients of expansion, such as brass and steel, the strips being securely brazed or welded together lengthwise.

The supporting member 11, as shown, has substantially a cup shape, the mouth of the cup being applied to the upper surface of the base 12. The switch arm 10 and the bimetallic bar 13 are secured together and to the supporting member 11 by means of a suitable eyelet rivet 14 which passes through apertures provided for it in the switch arm and bimetallic bar 13. This assembly is detachably secured to the base 12 by means of a screw 14a passed through the eyelet and threaded in the base, as shown. Electrically insulating washers 15 are placed on opposite sides and between the switch arm 10 and the bimetallic bar 13. These washers function to electrically insulate the switch arm from the bimetallic bar and both of these members from the support 11. These washers may be formed of any suitable electrically insulating material, such as mica.

The switch arm 10 on its free end carries a suitable switch contact 16 which cooperates with a switch contact 17 carried on the free end of the bimetallic bar 13. It is contemplated that both the switch arm 10 and the bimetallic bar 13 will be included in the electrical circuit to be controlled. As shown, each of these members projects somewhat to the left of the support 11, as viewed in Figs. 1, 2 and 3, and to these projecting ends are secured suitable binding or terminal screws 20 and 21, respectively. It will be understood that in order to connect the control device in the circuit to be controlled, it is merely necessary to connect the terminals 20 and 21 into the circuit. It will be understood, of course, that the control device may be connected directly into the circuit to be controlled or into a controlling circuit for the circuit to be controlled.

A suitable resilient spring member 22 cooperates with the switch arm 10 so as to move the switch arm quickly between its open and closed positions, depending upon the relative positions of the switch arm and the spring member 22. As shown, the spring member 22 has substantially an inverted U-shape, and has one arm bearing on the switch arm in a knife-edge bearing seat 23 provided for it in the arm located relatively close to the contact 16, but between the contact 16 and the point of support for the switch arm on the base 11. The other arm of the U-shaped spring member 22 rests in a knife-edge bearing seat 24 provided for it in a U-shaped member 25 carried on the free end of the bimetallic bar 13. As shown, the arms of this spring member 24 straddle the end of the bar 13, the lower arm being rigidly secured to the free end of the bimetallic bar, while the upper arm carries the bearing seat 24 provided for the spring member 22. The U-shaped member 25 is secured to the bimetallic bar 13 by means of a suitable stud 26 which preferably and as shown (Fig. 1) will be formed integrally with the contact 17. The member 25 is electrically insulated from the bimetallic bar and from the stud 26 by means of electrically insulating washers 27 formed of any suitable material, such as mica.

In the operation of my temperature control device shown in Figs. 1–3, it will be understood that when the plate 12 and hence the bimetallic bar has a temperature below a predetermined maximum, the bar will occupy the position shown in Fig. 1, that is, it will hold the contacts 16 and 17 closed. In this position of the bimetallic bar shown in Fig. 1, the spring member 22 will be in such a position that its left-hand leg will exert a downward component of pressure on the bearing seat 23, whereas its right-hand leg will exert an upward component of pressure on the member 25. These components of pressure operating in opposite directions will force the contacts 16 and 17 together with considerable pressure.

As the temperature of the body 12 and of the bimetallic bar increases, forces are set up in the bar which tend to move its free end downwardly, as viewed in Figs. 1 and 3, to separate the contacts. As the temperature of the bar increases, the distortion of the bar tends more and more to move its free end downwardly. This movement of the bar is resisted by forces applied by the spring member 22 in a downward direction on the spring member 10 and in an upward direction on the U-shaped member 25. However, as the temperature increases, the tension of the bar overcomes this force exerted by the spring member 22 and the bar moves downwardly. As the bar moves downwardly it carries the member 25 and hence the bearing seat 24 with it. During the first portion of the movement of the bar 13 downwardly, the switch arm 10 will tend to follow it because of the downward pressure exerted upon it by the U-shaped spring member 22. However, upon the occurrence of a predetermined maximum temperature, the knife-edge bearing 24 will have been moved by the bimetallic bar to such a position relative to the bearing 23 that a state of instability will have been reached and any further downward movement of the bimetallic bar below this critical position will cause the forces exerted by the spring member 22 to reverse, that is, the left-hand leg of the spring will tend to move the switch arm 10 upwardly, whereas the right-hand leg will tend to move the bimetallic bar 13 downwardly. This operation opens the switch contacts with a snap action. Thus, as the bimetal bar 13 moves downwardly in response to increase in its temperature, the switch arm 10 will follow the bar until the bar has moved substantially to the critical position where the forces exerted by the spring 22 reverse, whereupon the switch arm and bimetal bar are quickly separated by the spring 22 so as to open the contacts 16 and 17 with a snap action. It will be observed, therefore, that the contacts 16 and 17 are held closed until the bar 13 moves to the critical position, whereupon they are quickly opened. This action, of course, has the obvious advantage that it prevents sparking and arcing at the contacts. The upper leg of the U-shaped member 25 functions as a stop for the switch arm 10, as shown in Fig. 3, when the bimetal bar operates to open the switch.

When the temperature of the plate 12 decreases, the reverse action takes place. Thus, the bar 13 as its temperature decreases tends to move upwardly from its position shown in Fig. 3 to its position shown in Fig. 1. This movement of the bar is resisted by the spring member 22 until the temperature is reduced to a predetermined minimum, whereupon the bar will move through a critical position so as to cause the contacts to close with a snap action.

In this manner, the thermostat will function to maintain a predetermined temperature which is a mean between the maximum and minimum temperatures at which the switch is opened and closed.

In order to change the temperature setting of the device, I have provided suitable means for changing the position of the bimetallic bar 13 and hence the position of the bearing 24 provided for the spring member 22. For this purpose, I have provided a suitable adjusting screw 19 mounted in a supporting member 28 and, as shown, having a screw threaded engagement with it. The supporting member 28, as shown, is mounted above the spring member 10 upon an arm 30, which in turn is supported upon the cup-shaped base 11. This arm is electrically insulated from the switch arm by means of the mica strip 15. The screw member 19 carries on its lower end an insulating stop or abutment 31 which may be formed of any suitable electrically insulating material, such as lava. This member 31 passes through an aperture provided for it in the spring member 10 and bears directly on the bimetallic thermostat bar 13. It will be observed that the position of the bimetallic bar may be changed merely by adjusting the position of the screw member 19 in the support 28. In order to set the device to maintain a lower temperature, the screw 19 is turned downward, whereas to increase this temperature the screw is turned upward.

In Figs. 4 and 5 I have shown a modified form of my invention wherein the U-shaped spring member controlling the snap action of the switch bears directly on the free end of the bimetallic bar and is carried by a bearing on the switch arm; and where a somewhat different form of control for temperature setting is provided.

As shown in these figures, this control device comprises a bimetallic thermostat bar 40 having one end rigidly secured to a metallic member 40a by spot welding, or in some other suitable manner. The member 40a is in turn secured to a base 41. A flexible switch arm 42 is arranged beneath the bimetallic bar 40 in substantially parallel relation with it and has one end fixedly secured to the base 41. The members 40a and 42 are secured to the base 41 by means of an eyelet rivet 43 in substantially the same fashion as are the members 10 and 13 secured to the base 11 of Fig. 1, and are electrically insulated from the base by means of suitable washers 43a. The free end of the bimetallic bar 40 carries a switch contact 44 which cooperates with a switch contact 45 carried on the free end of the switch arm 42. In this case the bar 40 moves upwardly to open the contacts when its temperature increases.

The switch arm 42, as shown, carries on its free end a U-shaped bearing member 46 having a knife-edge bearing seat 47 in it arranged adjacent the free end of the bimetallic bar 40. Bearing in this seat 47 is one arm of a suitable U-shaped spring member 48, the other arm of which bears directly on the free end of the bimetallic bar 40.

Carried by the switch arm 42 between its contact 45 and the base 41 is a U-shaped member 50 having the lower ends of its arms secured to the opposite sides of the switch arm. The base of this U bridges the bimetallic bar 40. As shown, this base carries a suitable electrically insulated member 51 which functions as a stop for the bimetallic bar after it has operated to open the switch.

Suitable terminal members 52 and 53 are secured to the member 40a and to the spring 42 respectively. These terminals may be defined by ears or projections formed integrally with the members 40a and 42.

The operation of this form of the invention is substantially the same as the operation of the form shown in Figs. 1–3. Thus, when the bimetallic bar has a temperature below a predetermined value, it is in its position shown in Fig. 5 holding the contacts closed. When the contacts are closed, the spring member 48 supplies a pressure to the free end of the bimetallic bar to hold the contacts closed and to resist the initial tendency of the thermostat bar to move upwardly to its open contact position upon increase in temperature. When the temperature of the bimetallic bar 40 increases to a predetermined maximum the bar will overcome the resistance of the spring 42 to its upward movement and will move rapidly to and through a critical position in which the forces exerted by the spring member 42 are reversed. The spring 42 thereupon quickly separates the switch arm and bimetal bar so as to open the contacts with a snap action.

On the other hand, when the temperature of the bar decreases to a predetermined minimum the bar will move downwardly to effect the closure of the contacts with a snap action.

In this case, the temperature setting of the control device is changed by means of a suitable adjusting screw 53 mounted in a support 54, similar to the support 28 of Figs. 1, 2 and 3, and having its lower end bearing upon the bridge member 50. The position of the bridge 50 and hence that of the flexible switch arm 42 and the bearing seat 47 carried thereby is adjusted by moving the screw 53 to different positions. To lower the temperature setting of the device, it is merely necessary to turn the screw downward, whereas to increase the temperature setting the screw is turned upward. The electrically insulating member 51 insulates the screw 53 from the bridge 50.

It will be observed that I have provided a temperature control device which is small and very compact in construction. All of the operative elements are supported upon a relatively small cup-shaped base, which can be easily secured to the device whose temperature is to be controlled by means of a single screw. Moreover, it will be observed that the parts of the mechanism are relatively simple in their construction and inexpensive to make.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent in the United States is:

1. A temperature control device comprising a thermostat member movable in a predetermined plane responsively to temperature changes and having a bearing seat thereon, a flexible switch arm arranged in substantially parallel spaced relation with said thermostat member and movable in said plane of movement and having a bearing seat thereon, a common mounting for said thermostat member and switch arm, a member having an aperture therethrough riveting said thermostat member and said switch arm to said mounting an elastic member having portions pivotally resting in said bearing seats on said thermostat and on said switch arm arranged to move said switch arm quickly between controlling positions, an adjusting device supported on said mounting and secured thereto by said riveting member, said adjusting device having an adjustable member bearing on said thermostat member arranged by adjustment thereof to vary the position of said thermostat member relative to said switch arm so as to adjust the temperature setting of said control device, and said riveting member adapted to receive a securing member through its aperture whereby said mounting, said thermostat member, switch arm, elastic member and adjusting device can be secured as a unit to a device whose temperature is to be controlled.

2. A temperature control device comprising a cup-shaped metallic support, a thermostat bar mounted on said support, a bearing seat on said thermostat bar, a switch arm mounted on said support above and substantially parallel to and coextensive with said thermostat bar arranged to move in the plane of movement of said thermostat bar, an eyelet riveting said thermostat bar and switch arm to said support, bearing seats on said thermostat bar and said switch arm, an elastic spring having one end pivoted on said seat on said thermostat bar and its other end pivoted on said seat on said switch arm arranged to move said switch arm quickly between controlling positions in said plane of movement, a bracket on said support riveted thereto by said eyelet, and an adjusting screw mounted on said bracket extending downwardly therefrom through an aperture provided for it in said switch arm so that its lower end bears on said thermostat bar.

3. A temperature control device comprising a bimetallic thermostat bar having one end movable in a predetermined plane, a flexible switch arm arranged in substantially parallel spaced relation with said thermostat bar, a U-shaped member on said free end of said thermostat bar having its legs spanning one end of said switch arm, a bearing seat on said member and a bearing seat on said switch arm, a spring having its ends resting in said bearing seats arranged to move said switch arm quickly between controlling positions responsively to movement of said thermostat bar, cooperating contacts on said thermostat bar and said switch arm defining one relative position of said members, and one arm of said U-shaped member acting as a stop to limit the movement of said switch arm away from said thermostat bar.

4. A temperature control device comprising a flexible switch arm, a bimetallic bar substantially parallel with said switch arm, a cup-shaped support, an eyelet securing corresponding ends of said bimetallic bar and said switch arm to the base of said support, the other ends of said members being free to move in a common plane, a bearing mounted on said switch arm and a bearing on said bimetallic bar, a spring member having its ends mounted in said bearings so as to move said thermostat and switch arm quickly away from and toward each other depending upon the relative positions of said members in said plane, and an adjusting member mounted on the base of said cup-shaped support secured to said support by said eyelet and cooperating with said thermostat bar and switch arm to vary their relative positions, and said eyelet having an opening extending axially therethrough adapted to receive a screw whereby the entire assembly of said cup-shaped support, switch arm, bimetallic bar, spring member and adjusting member may be secured to a heated device.

5. A temperature control device comprising a thermostatic bar having one end fixed and its other end free to move in response to changes in temperature, a flexible switch arm substantially parallel with and spaced somewhat from said thermostatic bar and movable in the plane of movement of said bar, cooperating switch contacts carried by said thermostatic bar and said switch arm, a spring having one end bearing on said thermostatic bar and its other end bearing on said switch arm arranged to move said thermostatic bar and switch arm quickly away from and toward each other depending upon the relative positions of said members and means for varying the position of said thermostatic bar to adjust the temperature setting of said control device.

6. A temperature control device comprising a support, a bimetallic thermostatic bar having one end secured to said support and its other end free to move in response to changes in temperature, a flexible switch arm substantially parallel with and spaced somewhat from said thermostatic bar having one end secured to said support and its other end free to move in the plane of movement of said free end of said thermostatic bar, cooperating switch contacts carried by the free ends of said thermostatic bar and said switch arm, a bearing seat on said switch arm located between said contacts and the point of support of said arm on said support, a bearing seat adjacent the movable end of said switch arm carried by the free end of said thermostatic bar and movable with said bar in the plane of movement of said switch arm and a U-shaped spring member having one arm resting in the bearing seat on said switch arm and one arm resting in the bearing seat carried by said thermostatic bar.

7. A temperature control device comprising a flexible switch arm, a bimetallic bar substantially parallel with said switch arm, means supporting corresponding ends of said bimetallic bar and said switch arm, the other ends of said members being free to move, cooperating switch contacts carried by said free ends, a bearing mounted on the free end of said switch arm adjacent the free end of said bimetallic bar and a U-shaped spring member having one arm mounted in said bearing carried by the free end of said switch arm and its other arm bearing on the free end of said thermostatic bar, and means for changing the position of said switch arm so as to change the temperature setting of said device.

8. A temperature control device comprising a flexible switch arm, a bimetallic bar substantially parallel with said switch arm, supporting means securing corresponding ends of said bimetallic bar and said switch arm, the other ends of said members being free to move in a common plane of movement, cooperating switch contacts carried by said free ends, a bearing mounted on the free end of said switch arm adjacent the free end of said bimetallic bar and a spring member having one arm mounted in said bearing carried by the free end of said switch arm and its other end bearing on the free end of said thermostat bar so as to move said thermostat and switch arm quickly away from and toward each other depending upon the relative positions of said members in said plane of movement.

9. A temperature control device comprising a flexible switch arm, a bimetallic bar substantially parallel with said switch arm, a cup-shaped support, a screw securing corresponding ends of said bimetallic bar and said switch arm to the base of said support, the other ends of said members being free to move in a common plane of movement, cooperating switch contacts carried by said free ends, a bearing mounted on the free end of said switch arm adjacent the free end of said bimetallic bar and a spring member having one arm mounted in said bearing carried by the free end of said switch arm and its other end bearing on the free end of said thermostat bar so as to move said thermostat and switch arm quickly away from and toward each other depending upon the relative positions of said members in said plane of movement.

ROBERT L. UHL.

CERTIFICATE OF CORRECTION.

Patent No. 2,085,557.

June 29, 1937.

ROBERT L. UHL.

It is hereby certified that error appears in the printed specification of the above numbered patent requiring correction as follows: Page 3, second column, line 53, claim 1, after the word "mounting" insert a comma; and that the said Letters Patent should be read with this correction therein that the same may conform to the record of the case in the Patent Office.

Signed and sealed this 31st day of August, A. D. 1937.

Leslie Frazer (Seal)

Acting Commissioner of Patents.